United States Patent
Duvinage et al.

(10) Patent No.: US 6,209,316 B1
(45) Date of Patent: Apr. 3, 2001

(54) METHOD FOR RUNNING A DIESEL ENGINE

(75) Inventors: Frank Duvinage, Kirchheim; Hans Fausten, Winterbach; Nicholas Fekete, Fellbach; Anton Kerckhoff, Stuttgart; Bernd Krutzsch, Denkendorf; Thomas Liebscher, Fellbach; Stefan Pischinger, Aachen; Michel Weibel, Stuttgart, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/355,788
(22) PCT Filed: Nov. 14, 1998
(86) PCT No.: PCT/EP98/07293
 § 371 Date: Nov. 5, 1999
 § 102(e) Date: Nov. 5, 1999
(87) PCT Pub. No.: WO99/30021
 PCT Pub. Date: Jun. 17, 1999

(30) Foreign Application Priority Data

Dec. 4, 1997 (DE) ............................................. 197 53 718

(51) Int. Cl.⁷ ...................................................... F01N 3/00
(52) U.S. Cl. ................................ 60/274; 60/285; 60/286; 60/295; 60/301
(58) Field of Search ............................ 60/274, 285, 286, 60/301, 295, 280

(56) References Cited

U.S. PATENT DOCUMENTS 5,448,887 * 9/1995 Takeshima .............................. 60/278
5,461,857 * 10/1995 Itou et al. ............................... 60/276
5,551,231 * 9/1996 Tanaka et al. .......................... 60/301
5,771,686 * 6/1998 Pischinger et al. .................... 60/274
5,934,072 * 8/1999 Hirota et al. ........................... 60/301
6,032,461 * 3/2000 Kinugasa et al. ...................... 60/295

FOREIGN PATENT DOCUMENTS

| 196 07 151 C1 | 7/1997 | (DE) . |
| 197 16 275 C1 | 9/1998 | (DE) . |
| 0 560 991 A1 | 9/1993 | (EP) . |
| 0 732 485 A2 | 9/1996 | (EP) . |
| 0893154 * | 7/1998 | (EP) . |

* cited by examiner

Primary Examiner—Thomas Denion
Assistant Examiner—Thai-Ba Trieu
(74) Attorney, Agent, or Firm—Evenson, McKeown, Edwards & Lenahan, P.L.L.C.

(57) ABSTRACT

The invention relates to a method of operating a diesel engine having an engine controller which controls the operation of the diesel engine as a function of characteristic maps and permits rich/lean control of the diesel engine. The engine controller includes a computer which effects a changeover to rich or lean operation of the diesel engine as a function of predetermined changeover criteria, a sensor system which communicates with the computer and monitors parameters needed for changeover criteria, and a memory which communicates with the computer and in which the characteristic maps for operating the diesel engine are stored. The computer effects a changeover from lean to rich operation when all the changeover criteria in this respect are satisfied, and effects a change back from rich to lean operation when at least one of the changeover criteria in this respect is satisfied.

17 Claims, 1 Drawing Sheet

METHOD FOR RUNNING A DIESEL ENGINE

Figure 1:
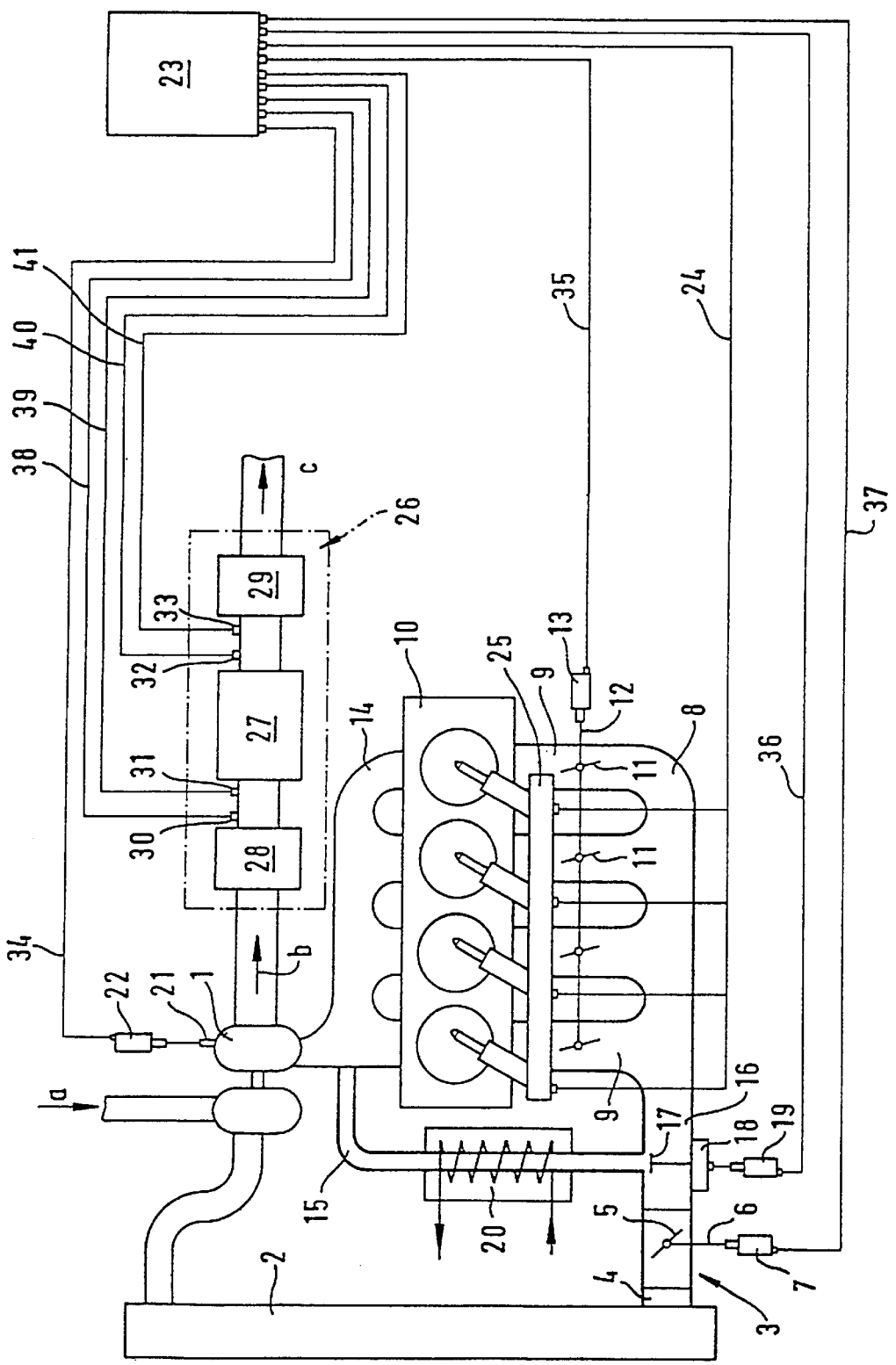

The invention relates to a method of operating a diesel engine having an engine controller which controls the operation of the diesel engine as a function of characteristic maps and permits rich/lean control of the diesel engine.

In order to reduce the pollutant emission of a diesel engine, the latter are operated, for example, with an exhaust-gas cleaning system through which the exhaust gases from the diesel engine flow. For the purpose of cleaning, $NO_x$ adsorber systems can be used, which are distinguished by a high potential $NO_x$ storage capacity. Such exhaust-gas cleaning systems, also referred to as $NO_x$ adsorber catalytic converters, store the nitrogen oxides ($NO_x$) of internal combustion engines under specific preconditions, providing said engines are operated "lean". Lean operation is present if the combustion air ratio lambda ($\lambda$) is greater than 1, that is to say if there is hyperstoichiometric combustion, in which there is residual oxygen in the exhaust gas. In order to regenerate such $NO_x$ adsorber systems, which are referred to as storage catalytic converters because of their storage capacity, a reducing exhaust gas with the highest possible reducing-agent content is needed in order that the $NO_x$ stored in the $NO_x$ adsorber catalytic converter can be released and converted to nitrogen oxide $NO_2$. An internal combustion engine produces reducing exhaust gas when there is "rich" combustion, that is to say hypostoichiometric combustion with $\lambda<1$, in which there is no or only a little residual oxygen in the exhaust gas.

As a result of the heterogeneous mixture formation method, diesel engines operate with excess oxygen ($\lambda>1$) over the entire characteristic map area. In order to be able to use an $NO_x$ adsorber system for cleaning the diesel engine exhaust gases in diesel engines, it must also be possible for the diesel engine to be changed over from time to time to rich operation, that is to say the diesel engine must have operating phases in which there is hypostoichiometric combustion with $\lambda<1$.

DE 43 34 763 A1 discloses a method of operating an internal combustion engine, an adsorption device for nitrogen oxides ($NO_x$) being arranged in an exhaust-gas cleaning system and adsorbing $NO_x$ when the combustion air ratio lambda is lean ($\lambda>1$) and releasing adsorbed $NO_x$ when the combustion air ratio becomes rich ($\lambda<1$). In this known method, the temperature of the $NO_x$ adsorption device is increased by injecting fuel into the exhaust gas and reduced by blowing air into the exhaust gas, in order to keep the operating temperature of the $NO_x$ storage device within a fixed range.

DE 195 43 219 C1 discloses a method of the type cited at the beginning in which a sensor for registering the $NO_x$ concentration in the exhaust-gas stream is arranged downstream of the storage catalytic converter and, when an $NO_x$ storage threshold value is reached, this value varying in accordance with a characteristic map as a function of speed and engine load, said sensor triggers a changeover from operating the diesel engine with $\lambda>1$ to operating with $\lambda<1$, in order to regenerate the storage catalytic converter in the rich operation of the diesel engine ($\lambda<1$). For this purpose, in the known method, an engine controller comprises a computer which effects a changeover to rich or lean operation of the diesel engine as a function of predetermined changeover criteria, and a sensor system which communicates with the computer and monitors parameters which are needed for changeover criteria, as well as a memory which communicates with the computer and in which the characteristic maps for the operation of the diesel engine are stored.

A diesel engine is normally operated in such a way that the maximum output is developed with the minimum fuel consumption. In addition, further boundary conditions, such as exhaust-gas emission values, the development of smoke and quietness of running, are taken into account when tuning the engine operation. The consequence of the abovementioned requirements is that a diesel engine is usually optimized for lean operation. In the case of an exhaust-gas cleaning system with a storage catalytic converter, this optimal operation of the diesel engine must be interrupted from time to time for rich operation, during which the adsorber catalytic converter is regenerated.

The present invention is concerned with the problem of configuring a method of the type cited at the beginning in such a way that the overall operating behaviour of the diesel engine is improved, taking into account the alternating phases of lean operation and rich operation.

The invention is based on the general idea of providing specific changeover criteria for a changeover from lean operation to rich operation of the diesel engine, and specific changeover criteria for changing back from rich operation to lean operation, a changeover to rich operation, which is less beneficial in terms of engine operation, being carried out only when all the changeover criteria provided in this respect have been satisfied, and a change back to lean operation, which is more beneficial with regard to the engine operating behaviour, or termination of the rich operation being carried out if one of the changeover criteria provided in this respect has already been satisfied. With the aid of these measures, it is possible to select the changeover criteria in such a way that, on the one hand, rich operation of the diesel engine is carried out only when this is necessary for the regeneration of the adsorber system and that, on the other hand, rich operation is carried out for only as long as is required for the regeneration of the adsorber system, and/or rich operation is terminated or interrupted when this is required in order to maintain a specific engine operating behaviour.

In the method according to the invention, a specific changeover criterion for changing over from lean to rich operation of the diesel engine is the maintenance of a regeneration temperature of a storage catalytic converter element through which the exhaust gases from the diesel engine flow. Maintaining the regeneration temperature of the storage or adsorber catalytic converter means that the regeneration time and thus the duration of the rich operating phase can be shortened, since the storage catalytic converter has the capability of releasing adsorbed $NO_x$ and simultaneously converting this into molecular nitrogen $N_2$ only above a specific temperature.

According to a development of the method according to the invention, in order to monitor the regeneration temperature, a temperature sensor can be used which is arranged in the exhaust-gas train upstream of the inlet to the storage catalytic converter element and communicates with the sensor system, the regeneration temperature, at which a changeover to rich operation can be carried out, preferably lying in a predetermined temperature range.

In a particular embodiment of the exhaust-gas cleaning device of the diesel engine, an oxygen-consuming catalytic converter element, in particular an oxidation catalytic converter, can be connected upstream of the storage catalytic converter element. In an expedient refinement of the method according to the invention, in a converter system constructed in this way, the temperature sensor can be arranged between the storage catalytic converter element and the oxygen-consuming catalytic converter element, by which means, in addition to the monitoring of the regeneration temperature, monitoring of the release of energy as a consequence of the exothermic reactions in the oxygen-consuming catalytic converter element can also be carried out.

In the method according to the invention, a further changeover criterion which must be satisfied for a changeover from lean to rich operation of the diesel engine, is the presence of a specific level of adsorption of a storage catalytic converter element through which the exhaust gases from the diesel engine flow. This measure prevents changing over too frequently to rich operation, as a result of which the overall operating behaviour of the diesel engine is considerably improved. In order to register the level of adsorption of the storage catalytic converter, it is possible for a number of measures to be carried out.

In a preferred embodiment of the method according to the invention, the level of adsorption of the storage catalytic converter element can be registered with the aid of characteristic maps in which the storage capacity of the storage catalytic converter element is stored as a function of its temperature and level of adsorption, and the exhaust-gas emission values of the diesel engine are stored as a function of the engine operating state. Using these characteristic maps, the increase in the adsorption per unit time is determined, starting from an initial level of adsorption at the beginning of a lean operating phase, and the respectively current level of adsorption is calculated.

In a development of the method according to the invention, $NO_x$ sensors can advantageously be provided which communicate with the sensor system and are arranged in the exhaust-gas train upstream and downstream of the storage catalytic converter element, and, using the said sensors for determining the level of adsorption of the storage catalytic converter element, monitor the quantity of $NO_x$ adsorbed by the latter.

In another embodiment of the method according to the invention, in order to determine the level of adsorption of the storage catalytic converter, an $NO_x$ sensor is provided which communicates with the sensor system and is arranged in the exhaust-gas train downstream of the storage catalytic converter element and monitors the quantity of $NO_x$ emerging from the storage catalytic converter element. In this case, a predetermined maximum value for the detected quantity of $NO_x$ is assigned to the predetermined level of adsorption at which a changeover to rich operation is to be carried out.

In a particularly advantageous embodiment of the method according to the invention, a changeover criterion for a changeover from lean to rich operation of the diesel engine is the presence of a steady-state or quasi steady-state engine operating state. This measure makes it relatively simply possible to match the operating behaviour of the diesel engine during its rich operation to the corresponding operating behaviour during lean operation, so that, for example, with respect to the development of power by the diesel engine, generally no change is noticed by the driver.

In a development of the method according to the invention, in order to detect a steady-state or quasi steady-state engine operating state, the sensor system is used to monitor signal values which correlate with the engine speed and/or with the pedal position and/or with the injection quantity and/or with the exhaust-gas temperature, for example upstream of the inlet to an exhaust-gas turbocharger, and/or with the engine torque and/or with the engine load. In this case, recourse is preferably had to the signals relating to engine speed and pedal position which are in any case available to the electronic engine control system or engine controller. The starting point for a steady-state or quasi steady-state engine operating state may be the instantaneously prevailing engine power or engine load, which can be determined, for example, using the current injection quantity and the current engine speed. An effective statement about the state of the engine is also possible with the aid of a sensor which detects the engine torque.

Expediently, in a refinement of the method according to the invention, the engine controller detects the presence of a steady-state or quasi steady-state engine operating state if changes in the monitored signals during predetermined time intervals do not exceed predetermined threshold values.

In the method according to the invention, one changeover criterion for changing back from rich to lean operation of the diesel engine is the absence of one of the changeover criteria for changing over from lean to rich operation, but with the changeover criterion relating to the level of adsorption being excluded.

In addition, in the method according to the invention, an additional or alternative changeover criterion for a change back from rich to lean operation of the diesel engine is the expiry of a regeneration time, which depends on the respective level of adsorption of a storage catalytic converter element through which the exhaust gases from the diesel engine flow, at the beginning of the rich operating phase.

The respective regeneration time, within which virtually complete release and conversion of the stored nitrogen oxides can be achieved, depends on the respective engine operating state of the diesel engine. Given a knowledge of the exhaust-gas composition with respect to the reducing agents carbon monoxide (CO) and hydrocarbons (HC) which is established in this engine operating state during a rich operating phase, as well as knowledge of the level of adsorption of the storage catalytic converter at the time of the changeover to rich operation of the engine, a relatively precise preset time is given for each engine operating state by the exhaust-gas volume flow which is present and by the corresponding chemical reaction equations, within which time the quantity or mass of reducing agents needed for the complete regeneration of the storage catalytic converter can be provided. Preferably, in a development of the method according to the invention, the regeneration time of the storage catalytic converter element is determined with the aid of characteristic maps in which the regeneration time is stored as a function of the engine operating state and of the level of adsorption of the storage catalytic converter.

Furthermore, in the method according to the invention, an additional or alternative changeover criterion for changing back from rich to lean operation of the diesel engine is the presence of a predetermined level of desorption of a storage catalytic converter element through which the exhaust gases from the diesel engine flow. In this case, in an expedient refinement of this method, the level of desorption of the storage catalytic converter can in turn be monitored with the aid of characteristic maps in which the regeneration time for a storage catalytic converter element is stored as a function of the engine operating state and of the level of adsorption of the storage catalytic converter.

In accordance with a particularly expedient embodiment of the method according to the invention, the current level of adsorption during lean operating and during rich operation is determined, on the one hand, by the level of adsorption at the beginning of a lean operating phase being ascertained from the level of adsorption at the beginning of a rich operating phase minus the desorption, in particular assigned in accordance with a characteristic map, during the rich operating phase and, on the other hand, by the level of adsorption at the beginning of a rich operating phase being ascertained from the level of adsorption at the beginning of a rich operating phase plus the adsorption, in particular assigned in accordance with a characteristic map, during the lean operating phase, appropriate characteristic maps being provided for the adsorption and desorption.

A further or alternative changeover criterion for changing back from rich to lean operation of the diesel engine in the method according to the invention is the presence of a predetermined reducing-agent content in the exhaust gases downstream of a storage catalytic converter element. This measure can be used to determine break-through of reducing agents through the storage catalytic converter. Such a breakthrough of reducing agents occurs when, following complete desorption and conversion of the stored nitrogen oxides, the diesel engine continues in rich operation. A reducing-agent break-through of this type is assumed, for example, when a predetermined threshold value for the HC emission and/or CO emission of the storage catalytic converter is exceeded, this threshold value being defined, preferably in characteristic maps, in accordance with the ratio of carbon monoxide to hydrocarbons in the exhaust gas of the diesel engine during rich operation of the latter.

In order to establish the reducing-agent content of the exhaust gases downstream of the storage catalytic converter, according to a development of the method according to the invention, at least one reducing-agent sensor, which is designed as an HC sensor or as a CO sensor or as a lambda probe, is arranged in the exhaust-gas train downstream of the storage catalytic converter.

In a diesel engine having a converter system whose storage catalytic converter has a $DeNO_x$ catalytic converter element connected downstream, in one expedient embodiment the reducing-agent sensor can be arranged between the storage catalytic converter element and this $DeNO_x$ catalytic converter element.

Furthermore, in the method according to the invention, an additional or alternative changeover criterion for changing back from rich to lean operation of the diesel engine is the presence of an exhaust-gas temperature which lies below a predetermined threshold value. In order to detect the exhaust-gas temperature, according to one development a temperature sensor can be provided which is arranged in the exhaust-gas train upstream of a storage catalytic converter element through which the exhaust gases flow, and communicates with the sensor system.

A refinement of this type is particularly advantageous when the converter system connected downstream of the diesel engine has an oxygen-consuming catalytic converter element arranged upstream of the storage catalytic converter. If the exothermic reactions which proceed in this oxygen-consuming catalytic converter element cause an increase in the temperature in such a way that the exhaust-gas temperature in the inlet region of the storage catalytic converter exceeds a specific limiting value, the thermal stability of the catalytic converter and further engine components is threatened, so that it is necessary to change back to lean operation. In this case, the temperature sensor is preferably arranged between the storage catalytic converter element and the oxygen-consuming catalytic converter element arranged upstream thereof.

According to a development of the method according to the invention, one changeover criterion for changing back from rich to lean operation of the diesel engine is the presence of a non-steady-state engine operating state. In particular, in order to detect the non-steady-state engine operating state, the sensor system can in turn be used to monitor signals which correlate with the engine speed and/or the pedal position and/or the injection quantity and/or the exhaust-gas temperature, preferably upstream of the inlet to an exhaust-gas turbocharger, and/or the engine speed and/or the engine load. It is preferable if, in such a refinement of the method according to the invention, the engine controller detects the presence of a non-steady-state engine operating state if changes in the monitored signal values during predetermined time intervals exceed predetermined threshold values.

In a particularly advantageous embodiment of a method according to the invention, in which a changeover to rich operation can be carried out when there is a steady-state or quasi steady-state engine operating state, and in which a change back to lean operation is carried out if a non-steady-state engine operating state is present, provision may be made for the predetermined time intervals and threshold values for establishing a non-steady-state engine operating state to differ from the predetermined time intervals and threshold values for establishing a steady-state or quasi steady-state engine operating state. This measure makes it possible to adapt the changeover criteria in an optimum way, both to high driving comfort and to an economical and ecological operating behaviour of the engine.

Further important features and advantages emerge from the subclaims, the drawing and from the following figure description of a preferred exemplary embodiment using the drawing, in which:

FIG. 1 shows a schematic arrangement of a diesel engine with exhaust-gas recycling, an exhaust-gas turbocharger, an exhaust-gas cleaning device and an engine controller with associated lines which connect individual units to the engine controller.

According to FIG. 1, an exhaust-gas turbocharger 1 takes in fresh air on its compressor inlet side in accordance with the arrow a, this air flows through a heat exchanger 2 at an appropriately increased pressure and reaches a throttling point 3 in the intake line 4.

Arranged at the throttling point 3 is a throttle 5, which can be actuated via an actuator 6 by a power-assisted actuating drive 7. Downstream of the throttling point 3, the fresh air firstly traverses an intake pipe 16 and then reaches an air collecting chamber 8, from where it is fed via separate induction tracks 9 to the combustion areas of the diesel engine 10. Arranged in the induction tracts 9 are respectively individual throttles 11 which, according to the exemplary embodiment, can be actuated via a common actuator 12 by a power-assisted actuating drive 13.

Downstream of the engine 10, the exhaust gases formed during the combustion are collected in an exhaust-gas collecting chamber 14 and are partly fed to the turbine inlet side of the exhaust-gas turbocharger 1. In addition, the exhaust-gas collecting chamber 14 communicates with an exhaust-gas recycling line 15, which opens into the intake pipe 16, that is to say downstream of the throttling point 3 and upstream of the air collecting chamber 8 in the air intake line 4.

Arranged in the intake pipe 16, in the opening region of the exhaust-gas recycling line 15, is a valve 17 which can be operated via an actuator 18 by a power-assisted actuating drive 19. In the exemplary embodiment illustrated, the exhaust-gas recycling line 15 exchanges heat with a heat exchanger 20, so that if necessary cooling of the recycled exhaust gas can be achieved.

The turbine inlet cross section and/or the exhaust-gas volume flowing through the turbine can be varied with the aid of an actuator 21, which can be operated by a power-assisted actuating drive 22. After flowing through the turbine of the exhaust-gas turbocharger 1, the exhaust gas is fed to an exhaust-gas cleaning system or converter system 26 in accordance with the arrow b. In accordance with arrow c, the cleaned exhaust gas is discharged into the environment, for example through an exhaust which is not shown.

The converter system 26 comprises an adsorber or storage catalytic converter element 27, an oxygen-consuming catalytic converter element 28 which is connected upstream of the latter and is preferably designed as an oxidation catalytic converter and a $DeNO_x$ catalytic converter element 29 connected downstream of the $NO_x$ adsorber catalytic converter 27. The converter system 26 thus comprises a number of partial elements 27, 28 and 29, in which different chemical reactions proceed. The partial elements 27, 28 and 29 can be arranged in such a way that the oxidation catalytic converter 28 is located relatively close upstream of the adsorber catalytic converter 27, while the $DeNO_x$ catalytic converter 29 is located relatively far away from the adsorber catalytic converter 27. In this way, the temperature of the exhaust gases can decrease or can be reduced on their flow path from the adsorber catalytic converter 27 to the $DeNO_x$ catalytic converter 29.

An oxidation catalytic converter 28 is used to extract the residual oxygen content from the diesel exhaust gases. The effect of this in lean operation of the diesel engine is that the storage capacity of the adsorber catalytic converter 27 for $NO_x$ is increased, since no storage capacity is lost as a result of the undesired storage of oxygen ($O_2$). However, the oxidation catalytic converter 28 is also helpful for rich operation. This is because the heterogeneous mixture formation in the diesel engine means that the diesel exhaust gases are not completely free of oxygen, even given a hypostoichiometric overall combustion air ratio ($\lambda<1$). In rich operation, the oxidation catalytic converter 28 therefore effects an increase in the regeneration speed. In addition, the exothermic or heat-energy releasing reaction proceeding in the oxidation catalytic converter 28 means that the operating temperature of the adsorber catalytic converter 27 can be reached earlier.

A $DeNO_x$ catalytic converter 29 is used to reduce nitrogen oxides $NO_x$ which flow through the adsorber catalytic converter 27 and are not adsorbed in operating states in which the adsorber catalytic converter 27 does not operate properly. Such operating states, in which the adsorber catalytic converter 27 does not function optimally, are given, for example, when the supplied exhaust gas lies outside the operating temperature range of the adsorber catalytic converter 27, or when the adsorber catalytic converter 27 is saturated to a high degree. In order to reduce $NO_x$ which "breaks through" the adsorber catalytic converter 27, reducing agents are stored in the $DeNO_x$ catalytic converter 29, and can be released in order to reduce the nitrogen oxides. The charging of the $DeNO_x$ catalytic converter 29 can be carried out within the engine, for example during rich operation, if the corresponding reducing agents pass through the adsorber catalytic converter 27 to a greater extent towards the end of the regeneration phase. Likewise, a supply of reducing agent outside the engine can be implemented, for example via specific fuel injection.

In the exhaust-gas stream, a temperature sensor 30 and a first $NO_x$ sensor 31 are arranged between the oxidation catalytic converter 28 and the adsorber catalytic converter 27. A second $NO_x$ sensor 32 and an HC sensor 33 are arranged in the exhaust-gas stream between the adsorber catalytic converter 27 and the $DeNO_x$ catalytic converter 29.

The diesel engine is controlled or regulated by an engine control system or engine controller 23, for which purpose the latter is connected via lines to the corresponding units of the diesel engine 10. For example, FIG. 1 illustrates a line 24 which connects the engine controller 23 to an injection system 25 of the diesel engine 10. Further lines 34, 35, 36 and 37 connect the engine controller 23 to the actuating drives 22, 13, 19 and 7. Furthermore, the engine controller 23 communicates via connecting lines 38, 39, 40 and 41 with the temperature sensor 30, with the $NO_x$ sensors 31 and 32 and with the HC sensor 33. In addition, the engine controller 23 communicates with a sensor system which is not illustrated but, with the aid of sensors, detects various parameters of the diesel engine 10, in particular of the converter system 26.

Integrated in the engine controller 23 is a computer or microprocessor and a memory which communicates therewith. Stored in this memory are, on the one hand, characteristic maps for the lean operation of the diesel engine 10, but, on the other hand, also characteristic maps for the rich operation of the diesel engine 10. A software switch is used to define the characteristic curves in accordance with which the diesel engine 10 is to be regulated by the engine controller 23. The position of the software switch depends on changeover criteria whose presence is continuously checked by the computer. In order to monitor the changeover criteria, it is possible for the computer, on the one hand, to have recourse to signals or signal values which are present in any case in the engine controller, such as engine speed, accelerator pedal position. On the other hand, additional signals or signal values can be taken into account in order to monitor other changeover criteria.

For example, the temperature sensor 30 is used to measure the exhaust-gas temperature upstream of the inlet to the storage catalytic converter element 27. A changeover criterion for a changeover to rich operation can therefore be, for example, the maintenance of a specific regeneration temperature which must be present in the storage catalytic converter 27. However, the temperature sensor 30 can also be used to establish a limiting temperature at which changing back to lean operation is required, since, for example, temperatures in the region of the thermal load limit of the storage catalytic converter 27 and of other engine components are reached. In addition, the temperature sensor 30 permits deliberate additional heating via exothermic reactions in the oxidation catalytic converter 28, in order to bring the adsorber catalytic converter 27 as quickly as possible to an optimum operating temperature.

With the aid of the $NO_x$ sensors 31 and 32, which are arranged in the exhaust-gas train on either side of the storage catalytic converter 27, it is particularly simply possible to determine the respective current level of adsorption of the storage catalytic converter 27.

The HC sensor 33 in the outlet region of the storage catalytic converter 25 is used for detecting reducing agents which emerge from the adsorber catalytic converter 27. If the quantity of reducing agent present in the exhaust-gas stream downstream of the adsorber catalytic converter 27 exceeds a predefined threshold value, this means, for rich operation, that the storage catalytic converter 27 has been completely regenerated or, for lean operation, that there is a functional fault in the storage catalytic converter 27. Instead of an HC sensor, in addition or as an alternative, other reducing-agent sensors can also be provided, such as a CO sensor or a lambda probe.

What is claimed is:
1. A method of operating a diesel engine having an engine controller which controls the operation of the diesel engine as a function of characteristic maps and permits rich/lean control of the diesel engine, wherein the engine controller comprises a computer which effects a changeover to rich or lean operation of the diesel engine as a function of predetermined changeover criteria, a sensor system which communicates with the computer and monitors parameters needed for changeover criteria, and a memory which communicates with the computer and in which the characteristic maps for operating the diesel engine are stored, comprising:

effecting a changeover with the computer from lean to rich operation only when all the following changeover criteria are satisfied:

a regeneration temperature of a storage catalytic converter element through which the exhaust gases from the diesel engine flow is maintained, and a predetermined level of adsorption of the storage catalytic converter element through which the exhaust gases from the diesel engine flow is present, and effecting a change back with the computer from rich to lean operation when any of the following changeover criteria is satisfied:

the changeover criteria for a changeover from lean to rich operation is absent, a regeneration time, which depends on the respective level of adsorption of the storage catalytic converter element through which the exhaust gases from the diesel engine flow, expires at the beginning of the rich operating phase, a predetermined level of desorption of the storage catalytic converter element through which the exhaust gases from the diesel engine flow is present, a predetermined reducing-agent content in the exhaust gases downstream of the storage catalytic converter element is present, or an exhaust-gas temperature below a predetermined threshold value is present.

2. The method according to claim 1, wherein a further changeover criterion which must also be satisfied for a changeover from lean to rich operation of the diesel engine is the presence of a steady-state or quasi steady-state engine operating state, and wherein a further changeover criterion which triggers a change back from rich to lean operation of the diesel engine is the presence of a non-steady-state engine operating state.

3. The method according to claim 2, wherein in order to detect a steady-state or quasi steady-state engine operating state and/or a non-steady-state engine operating state, the sensor system is used to monitor signal values for engine speed and/or accelerator pedal position and/or injection quantity and/or exhaust-gas temperature, upstream of the inlet to an exhaust-gas turbocharger, and/or engine torque and/or engine load.

4. The method according to claim 3, wherein the engine controller detects the presence of a steady-state or quasi steady-state engine operating state if changes in the monitored signal values during predetermined time intervals do not exceed predetermined threshold values, and/or the engine controller detects the presence of a non-steady-state engine operating state if changes in the monitored signal values during predetermined time intervals exceed predetermined threshold values.

5. The method according to claim 4, wherein the predetermined time intervals and threshold values for establishing a non-steady-state engine operating state differ from the predetermined time intervals and threshold values for establishing a steady-state or quasi steady-state engine operating state.

6. The method according to claim 1, wherein in order to monitor the regeneration temperature, a temperature sensor is used which is arranged in the exhaust-gas train upstream of the inlet to the storage catalytic converter element and communicates with the sensor system.

7. The method according to claim 6, wherein in order to monitor the regeneration temperature the temperature sensor is arranged between the storage catalytic converter element and an oxygen-consuming catalytic converter element which is connected upstream thereof in the exhaust-gas stream and is designed as an oxidation catalytic converter.

8. The method according to claim 1, wherein the level of adsorption of the storage catalytic converter element is registered with the aid of characteristic maps in which the storage capacity of the storage catalytic converter element is stored as a function of its temperature and level of adsorption, and the exhaust-gas emission values of the diesel engine are stored as a function of the engine operating state.

9. The method according to claim 8, wherein in order to determine the level of adsorption of the storage catalytic converter element, $NO_x$ sensors are provided which communicate with the sensor system and are arranged in the exhaust-gas train upstream and downstream of the storage catalytic converter element and are used to monitor the quantity of $NO_x$ adsorbed by the storage catalytic converter.

10. The method according to claim 1, wherein in order to determine the level of adsorption of the storage catalytic converter element, an $NO_x$ sensor is provided which communicates with the sensor system and is arranged in the exhaust-gas train downstream of the storage catalytic converter element and monitors the quantity of $NO_x$ emerging from the storage catalytic converter element, a predetermined maximum value for the detected quantity of $NO_x$ being assigned to the predetermined level of adsorption at which the changeover is carried out.

11. The method according to claim 1, wherein the regeneration time of the storage catalytic converter element is defined with the aid of characteristic maps in which the regeneration time is stored as a function of the engine operating state and of the level of adsorption of the storage catalytic converter element.

12. The method according to claim 1, wherein the level of desorption of the storage catalytic converter element is monitored with the aid of characteristic maps in which the regeneration time for the storage catalytic converter element is stored as a function of the engine operating state and of the level of adsorption of the storage catalytic converter element.

13. The method according to claim 1, wherein the level of adsorption of the storage catalytic converter element at the beginning of a lean operating phase is given by the level of adsorption at the beginning of a rich operating phase minus the desorption during the rich operating phase, and wherein the level of adsorption at the beginning of a rich operating phase is given by the level of adsorption at the beginning of a lean operating phase plus the adsorption during the lean operating phase, appropriate characteristic maps being provided for the adsorption and desorption.

14. The method according to claim 1, wherein in order to monitor the reducing-agent content in the exhaust-gas train, at least one reducing-agent sensor, which is designed as an HC sensor or as a CO sensor or as a lambda probe, is arranged downstream of the storage catalytic converter element.

15. The method according to claim 14, wherein in order to monitor the reducing-agent content, the reducing-agent sensor is arranged between the storage catalytic converter element and a DeNO$_x$ catalytic converter element arranged downstream thereof.

16. The method according to claim 1, wherein in order to monitor the exhaust-gas temperature, a temperature sensor is provided which is arranged in the exhaust-gas stream upstream of a storage catalytic converter element through which the exhaust gases flow, and communicates with the sensor system.

17. The method according to claim 16, wherein in order to monitor the exhaust-gas temperature, the temperature sensor is arranged between the storage catalytic converter element and an oxygen-consuming catalytic converter element which is connected upstream thereof in the exhaust-gas stream and is designed as an oxidation catalytic converter.

* * * * *